United States Patent [19]

Levine

[11] Patent Number: 4,567,912

[45] Date of Patent: Feb. 4, 1986

[54] MULTIPLE SPRAY NOZZLES

[75] Inventor: Walter E. Levine, Port Huron, Mich.

[73] Assignee: Acheson Industries, Inc., Port Huron, Mich.

[21] Appl. No.: 636,128

[22] Filed: Jul. 30, 1984

[51] Int. Cl.$^4$ .............................................. F16K 19/00

[52] U.S. Cl. ......................................... 137/606; 91/52; 137/268; 137/897; 239/304; 239/307; 239/428; 251/33; 251/42

[58] Field of Search ........................ 239/304, 307, 428; 137/606, 897, 889; 251/33, 42; 91/52

[56] References Cited

U.S. PATENT DOCUMENTS

| | | | |
|---|---|---|---|
| 624,890 | 5/1899 | Batchelor | 251/33 X |
| 1,077,795 | 11/1913 | Bruns . | |
| 1,975,067 | 9/1934 | Colclasure . | |
| 2,129,938 | 9/1938 | Johnson | 251/33 X |
| 2,973,718 | 3/1961 | Deutsch | 137/889 |
| 3,182,950 | 5/1965 | Stone . | |
| 3,393,658 | 7/1968 | Ott . | |
| 3,394,888 | 7/1968 | Dasse et al. . | |
| 3,512,550 | 5/1970 | Ammann . | |
| 3,561,680 | 2/1971 | Ott . | |
| 3,779,305 | 12/1973 | Pondelicek et al. . | |
| 3,807,641 | 4/1974 | Albright . | |
| 3,888,420 | 6/1975 | Boelkins . | |
| 3,902,663 | 9/1975 | Elmer . | |
| 3,920,099 | 11/1975 | Pondelicek et al. . | |
| 3,976,248 | 8/1976 | Middleton | 239/428 X |
| 3,995,717 | 12/1976 | Kroffke . | |
| 4,027,744 | 6/1977 | Kuhnelt et al. . | |
| 4,041,899 | 8/1977 | Wolfe et al. . | |
| 4,306,587 | 12/1981 | Tchebinyayeff | 137/606 |
| 4,365,754 | 12/1982 | Levine | 251/63 X |

OTHER PUBLICATIONS

The Rimrock Corporation, 1700 Rimrock Road, Columbus, Ohio 43219, Brochures entitled: Nozzle Model 030, Nozzle Model 031, Nozzle Model 040, Buffing Nozzle Model 040-0080-S4, Trouble Shooting Automatic Spray Systems with Poppet Type Shutoff Nozzles.

Acheson, Brochures entitled: Dag 015 Spray Nozzle, Dag Spray Nozzle 035, Dag 036 Spray Nozzle, Dag Nozzle Model 048.

*Primary Examiner*—Robert G. Nilson

*Attorney, Agent, or Firm*—Harness, Dickey & Pierce

[57] ABSTRACT

A spray assembly is disclosed which comprises a plurality of control valves disposed within a common housing each of which is independently actuatable whereby the flow of a plurality of fluids may be individually controlled for intermixing and delivery via a common outlet. The control valves utilized in the spray assembly of the present invention incorporate piston actuated plunger assemblies which are designed for extremely rapid operation whereby substantially maximum liquid fluid flow may be obtained almost instantaneously and rapid shut off may also be achieved.

3 Claims, 3 Drawing Figures

FIG. 1.
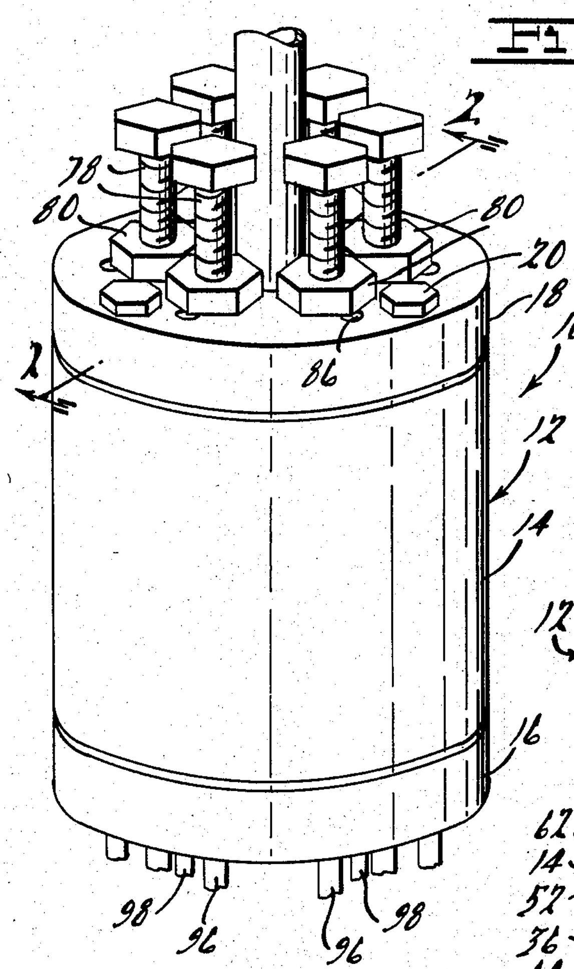
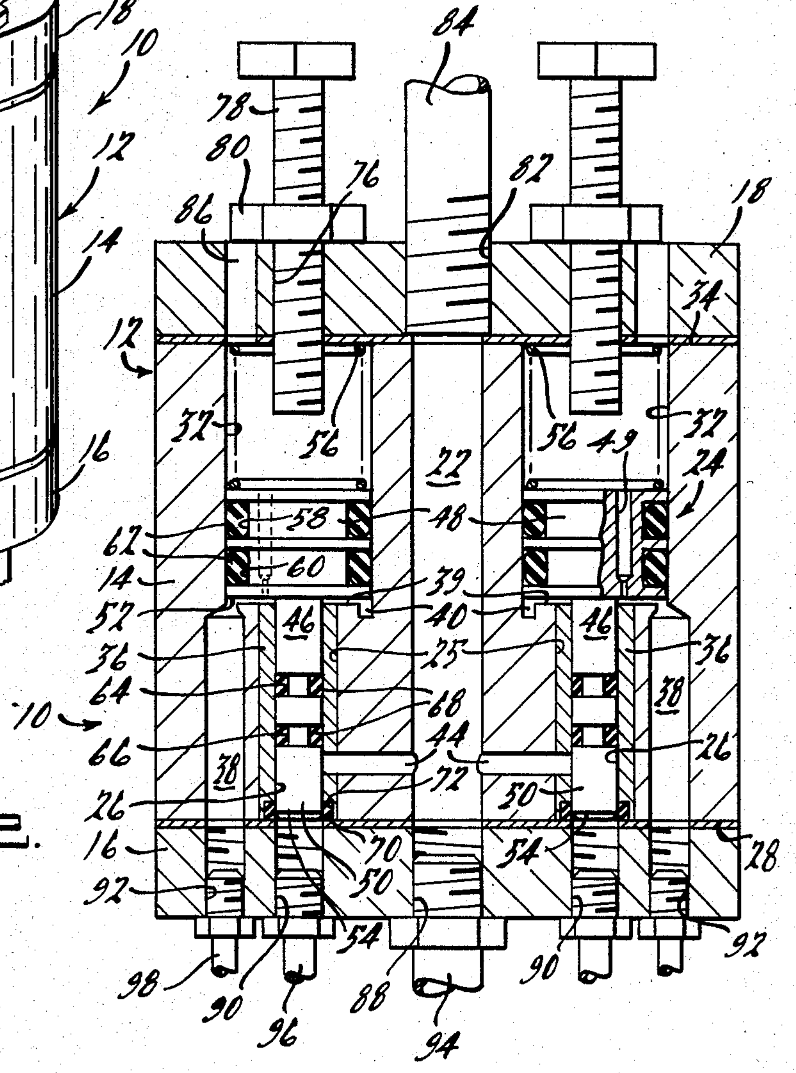
FIG. 2.
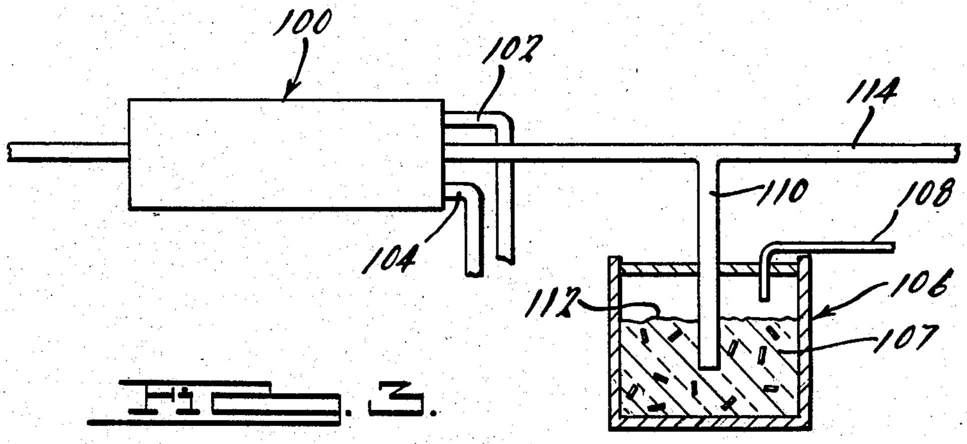
FIG. 3.

MULTIPLE SPRAY NOZZLES

BACKGROUND AND SUMMARY OF THE INVENTION

The present invention relates generally to spray assemblies and control valves associated therewith and more particularly to such spray assemblies and control valves which are particularly designed for spraying of fluids which are to be intermixed simultaneously with the application thereof to a working surface and/or applications requiring sequential spraying of a plurality of different fluids.

This application is related to and constitutes a modification of the invention disclosed and claimed in Levine et al U.S. Pat. No. 4,365,754 issued Dec. 28, 1982, which is assigned to the same assignee as the present invention and the disclosure of which is hereby incorporated by reference.

There exist a large number of applications in which it is necessary of desirable to apply a plurality of fluids to a working surface either sequentially or with the fluids intermixed. In many of those applications in which the fluids are to intermixed, the resulting mixture has a relatively short shelf or working life and hence it becomes desirable to delay mixing thereof as long as possible. Such fluids may be for example various resins and setting catalysts or hardeners for example. Further, the process of mixing large quantities of fluids manually is often cumbersome and messy and may entail delays in production operations as well as result in costly waste due to the need to dispose of left over quantities such as at the end of a day or production run. Further, some fluids may have a working life when mixed which is short enough to require mixing of small quantities at relatively frequent intervals during the working day.

With respect to those applications requiring sequential applications of different fluids either to the same or sequential work surfaces, it is very desirable to provide apparatus which may be easily so changed without the need to change or reposition the spraying apparatus. Also, with respect to those fluids which are to be intermixed, it is desirable to provide apparatus which accomplishes this mixing as they are being utilized thereby avoiding potential waste and/or delays in production.

The present invention provides an improved spraying apparatus which overcomes the above mentioned potential problems by enabling the internal mixing of a plurality of fluids within a common discharge passage whereby only the amounts required for the particular application are consumed. The apparatus comprises an extremely compact housing containing a plurality of independently actuatable valve assemblies equal in number to the fluids to be sprayed each of which is operable to selectively and independently control the flow of fluid to a common discharge passage. The valved porting and discharge passages are so arranged that a relatively thorough mixing and atomization of the fluids is achieved within the housing thereby assuring proper application of the mixture. Further, the passage arrangement offers the advantage of being substantially self-cleaning thereby minimizing the potential of clogging as well as reducing the possibility of contamination of one fluid by another in those applications requiring sequential spraying of different fluids.

Additional advantages and features of the present invention will become apparent from the subsequent description and the appended claims taken in conjunction with the accompanying drawings.

BRIEF DESCRIPTION OF THE DRAWINGS

FIG. 1 is a perspective view of a spray assembly in accordance with the present invention;

FIG. 2 is a section view of the spray apparatus of FIG. 1, the section being taken along line 2—2 thereof; and FIG. 3 is a view of the spray apparatus of the present invention shown in an application for spraying of particulated solids.

DESCRIPTION OF THE PREFERRED EMBODIMENTS

Referring now to the drawings and in particular to FIGS. 1 and 2 thereof, there is shown a spray assembly in accordance with the present invention indicated generally at 10. Spray assembly 10 comprises a generally cylindrically shaped housing 12 having a main body housing 14 and respective inlet and outlet end plates 16 and 18 secured to opposite ends thereof by a plurality of suitable fasteners 20 extending therethrough.

Main body housing 14 has a centrally located relatively large diameter main fluid passage 22 extending therethrough which is surrounded by a plurality of radially outwardly and circumferentially spaced valve arrangements 24 two of which are shown in FIG. 2 positioned on opposite diametric sides of main passage 22. As each of these valve arrangements are substantially identical in construction and operation, only a single such valve member will be described in detail, it being understood that any such number of valve arrangements desired for a particular application may be provided.

Valve arrangement 24 includes a passage 25 extending longitudinally inwardly in substantially parallel spaced relationship to passage 22 from one end 28 of main body housing and has an inner end which opens into a substantially larger diameter bore 32 extending inwardly from the opposite end 34 of main body housing 14. A tubular insert 36 preferably of a material which is resistant to attack by or reaction with the fluids to be sprayed and of a length substantially equal to that of passage 25 is press fitted within passage 25 and has an interior which define a fluid passageway 26.

A second longitudinally extending passage 38 also extends inwardly from end 28 of main body housing in substantially parallel spaced relationship to passages 22 and 26 and opens into an annular recess 40 provided at the inner end of bore 32. As shown, bore 32 and passage 26 are positioned in substantially coaxial relationship. A transversely extending passage 44 is also provided in main body housing 14 extending laterally generally perpendicular to the axis of and substantially radially between both passages 22 and 26.

A valve member 46 is movably disposed within bore 32 and includes a relatively large diameter piston 48 at one end thereof and a generally cylindrically shaped plunger portion 50 integrally formed therewith and extending axially movably into tubular insert 36. Valve member 46 has a length such that when the inner radially extending surface 52 of piston portion 48 engages the inner end wall 39 of bore 32, the terminal end portion 54 of plunger portion 50 will extend beyond laterally extending passage 44. Suitable biasing means 56 in the form of a helical coil spring is also provided within bore 32 being operative to bias valve member 46 into a closed position as shown.

Piston portion 48 of valve member 46 is also provided with a pair of axially spaced annular grooves 58 and 60 within which suitable sealing means 62 such as a pair of O-rings are provided which sealingly engage the sidewalls of bore 32. Similarly, plunger portion 50 of valve member 46 also has a pair of axially spaced annular grooves 64 and 66 provided thereon within which suitable sealing means 68 such as O-rings or the like are provided which sealingly engage the inner sidewalls of insert 36 and operate to prevent axial leakage of fluids thereacross.

In order to reduce or prevent the entry of dirt, debris, corrosive atmosphere or other undesirable elements into the area above piston portion 48 of valve member 46 during cyclic operation thereof, a relatively small diameter bleed passage 49 is provided extending axially through piston portion 48 as best seen with reference to FIG. 2 which enables a portion of the control air to pressurize bore 32 above piston portion 48 during actuation thereof.

The outer end portion of insert 36 is also provided with a relatively small annular recess 72 within which an annular seal 70 is fitted which is adapted to sealingly engage the terminal end of portion 54 of plunger 50 when valve member 46 is in a fully closed position as shown so as to prevent fluid flow into insert 36 thereby effectively sealing off passage 44. Preferably, plunger portion 50 will have a diameter slightly less than the inside diameter of insert 36.

In order to limit the axial travel of each of the valve members 46, outlet plate 18 is provided with a plurality of spaced threaded openings 76 through which elongated stop members 78 extend into respective bores 32. A jam nut 80 is also provided on each of the stop members 78 so as to enable them to be each independently locked in position.

Outlet plate 18 is also provided with another opening 82 aligned with passage 22 which is adapted to receive a suitable spray head or extension tube 84. A plurality of vent passages 86 are also provided in outlet plate 18 adjacent each of the openings 76 which communicate with respective ones of the plurality of bores 32 and enables air contained therein to be vented to atmosphere upon actuation of valve members 46 thereby facilitating rapid movement thereof.

Inlet plate 16 is provided with a central threaded opening 88 to which a suitable source of compressed air may be connected. A first plurality of openings 90 for supplying the respective fluids to be sprayed are also provided being spaced radially outwardly from central opening 88 and a second plurality of openings 92 for supplying actuating compressed air to the respective vlave members are positioned adjacent thereto.

In operation, a source of compressed air controlled by remote valve means (not shown) will be supplied to passage 22 via supply line 94. Similarly, sources of pressurized fluids to be sprayed are supplied to respective passages 26 via respective associated supply lines 96. Sources of control air which may preferably contain a small amount of lubricating oil are also supplied to each of the valve members of the spray assembly via supply lines 98 connected in fluid communication with respective passages 38.

Initially, remotely located valving means will be actuated so as to allow a flow of compressed air to flow through passage 22. Thereafter control air, the supply of which is also controlled by remote valving, will be supplied to one or more of the respective passages 38 and flow therethrough into annular recess 40 thereby causing the piston 48 of the associated valve member 46 to move rapidly axially upward (as shown) into an open position. This rapid axial opening movement of valve member 46 will operate to move plunger portion 50 axially upwardly and outwardly of passage 22 thereby enabling the fluid or fluids which are to be sprayed to flow longitudinally through passage 26 and transverse passage 44 into the flowing air stream in passage 22 where they will be intermixed, atomized and carried out through the tube or nozzle assembly 84 secured to the outlet plate 18 and onto the desired working surfaces. Because of the provision of the annular recess 40 within bore 32 which enables the control air to act on a relatively large surface area of piston 48 and the fact that the area of bore 32 located above piston 48 as shown in the drawings is vented to atmosphere via passage 86, the valve member 46 will be moved into a fully open position very rapidly thereby providing what may be referred to as a "hydraulic jump" in which substantially full pressurized liquid flow is obtained almost immediately and the liquid is allowed to "explode" into the air flow through passage 22 thereby enabling relatively large volumes of liquid to be applied very rapidly. When the control air pressure is released, which may be accomplished by remote valving, biasing spring 56 will operate to rapidly move valve member 46 axially downwardly into a closed position such as that shown in FIG. 2. Bleed passage 49 will allow a small amount of the control air to flow into the area of bore 32 above piston portion 48 as it moves downwardly thereby preventing or at least reducing the possibility of contaminents entering via vent passage 86. Preferably, both the supply of control air and bleed passage 49 will be sized relative to vent passage 86 so as to maintain a zero or slightly positive pressure (gauge) within the area of bore 32 above piston portion 48 during closing movement thereof. Additionally, lubricating oil may also be carried over via this bleed air flow to provide lubrication to bore 32 and prevent possible sticking of the sealing means 62. Again, passage 86 will allow atmospheric air to flow inwardly as valve member 46 moves axially downwardly thereby enabling rapid interruption of liquid flow through spray assembly 10.

It should also be noted that when valve member 46 is in a fully open position, plunger portion 50 will be located axially above transverse passage 44 thereby allowing substantially unobstructed fluid flow through passage 26. However, if in some applications it is desired to modulate or reduce the quantity of one or more fluids with respect to each other or with respect to the air flow being sprayed, any of the stop members 78 may be adjusted axially inwardly so as to limit the axial upward movement of the associated valve member 46 whereby the respective plunger 50 only partially uncovers passage 44 thereby allowing only a reduced volume of fluid flow therethrough. Thus, it is possible to individually control both the flow as well as the rate of flow of each of a plurality of fluids and to provide for intermixing thereof in substantially any desired proportions within the spray apparatus itself as it is being used thereby reducing the potential for costly waste.

It should also be noted that the present invention is particularly well suited for sequentially spraying of different fluids with little if any cross contamination between successive fluids. This is because continued air flow through central passage 22 subsequent to closing of the fluid control valves 46 effects a relatively thorough self-cleaning not only of the air flow passage 22 and extension 84 but also the laterally connecting feed passages 44 as well. This self-cleaning action renders the present invention ideally suited not only for sequential spraying of different fluids such as for example paints of varying color but also avoids clogging of the unit between uses when reactive fluids such as resins and hardeners are being sprayed.

The present invention may also be utilized for intermixing and spraying a combination of solids and liquids as well as solids by themselves. For example, in some applications it may be desirable to spray a resin and hardener mixture to which is added a solid filler material. Such an arrangement is shown in FIG. 3 wherein a spray apparatus 100 in accordance with the present invention is shown with a pair of liquid feed lines 102, 104 connected thereto. Spray apparatus 100 will preferably be substantially identical in construction and operation to spray assembly 10 described above. A reservoir 106 of solids 107 to be sprayed is provided which is pressurized by means of conduit 108 projecting through the top thereof the other end of which is connected to a source of pressurized air. An outlet 110 is also provided which projects from below the upper level 112 of the solids out through the top of the container and is connected to the central compressed air supply line 114 in such a manner that air flow therethrough will act as an eductor drawing the solids into the air stream. Thereafter, the solid particles 107 will be carried into the spray assembly 100 wherein they will be intermixed with one or more fluids such as for example a resin and associated curing agent as described in detail above. Various types of solids may be utilized in this manner such as for example powders, granular substances, spheres or rod-like particles; the only limiting factors being that the particles must be of a size and shape such that they are able to be carried by the air stream.

Thus as may now be appreciated, the present invention provides an improved spray which is economical to manufacture, efficient in operation and allows a wide versatility in applying various types of coatings without the need to substitute different apparatus. Not only is the present invention compact in size thereby allowing substantial flexibility in it positioning but also because the various fluids to be sprayed are discharged via a common discharge passage, there is no need to reposition the spray apparatus as may be required were separate discharge passages utilized.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. In a spray apparatus for selectively mixing and applying a primary and a plurality of secondary fluids to a working surface, improved valve means for controlling the flow of said fluids comprising:

a main body housing;

a first elongated main fluid passageway extending substantially linearly through said main body housing and having an inlet at one end and an outlet at the other end;

a plurality of circumferentially spaced valve arrangements within said housing and positioned around said main fluid passage and radially spaced therefrom, each of said valve arrangements being operative to independently control one of said fluids and comprising:

a second fluid passageway extending into said housing and spaced from said first passageway, said second fluid passageway having an inlet at one end thereof;

a substantially unrestricted connecting passage having one end opening into said first fluid passageway intermediate the ends thereof and the other end defining a port opening into said second fluid passageway;

a bore provided within said housing;

valve means including a plunger movably disposed within said second fluid passageway and piston means movably disposed within said bore, said plunger being movable into and out of overlying relationship to said port so as to selectively control fluid flow from said second fluid passageway to said first fluid passageway via said connecting passage in response to movement of said piston means;

biasing means for urging said piston into a first position toward one end of said bore end and in which said plunger is positioned within said second fluid passageway so as to prevent fluid communication between said connecting fluid passage and said second fluid passageway; and actuating means for selectively moving said piston means out of said first position whereby said plunger is moved outwardly of said second fluid passageway so as to enable said one of said plurality of secondary fluids to flow through said second fluid passageway and said connecting passage into said main fluid passageway, any number of said valve arrangements being simultaneously operable whereby said primary and any number of said plurality of secondary fluids may be intermixed and simultaneously applied to said working surfaces, said actuating means including third fluid passage means spaced from said second fluid passageway and having one end opening into said bore on one side of said piston, said third fluid passage means being operable to selectively conduct a pressurized gas having a lubricant entrained therein into and out of said bore on one side of said piston, said piston including a restricted vent passage extending axially therethrough, said vent passage being operative to bleed said pressurized gas and entrained lubricant across said piston whereby said entrained lubricant is deposited on the sidewalls of said bore on the other side of said piston whereby said bore is fully coated with lubricant to insure free movement of said piston therein, said actuating means being operable independently of fluid flow through said first fluid passageway whereby said fluid flow through said first fluid passageway may continue after movement of said valve member into overlying relationship to said port thereby enabling said primary fluid flow to evacuate said connecting passage.

2. A spray assembly as set forth in claim 1 wherein each of said plurality of valve arrangements includes means for varying the rate of flow of a secondary fluid associated therewith whereby the ratio of mixing of secondary fluids may be selectively controlled.

3. A spray assembly as set forth in claim 1 further comprising a second vent passage in said housing for venting said other side of said piston to atmosphere, said restricted vent passage in said piston being sized relative to the size of said second vent passage so as to substantially prevent movement of atmospheric air into said bore via said second vent passage.

* * * * *